United States Patent [19]

Omholt

[11] 4,325,531

[45] Apr. 20, 1982

[54] APPARATUS FOR REMOVABLY SECURING A CONTAINER TO A CARRIER RACK

[76] Inventor: Bruce D. Omholt, 2117 Richmond, N.W., Grand Rapids, Mich. 49504

[21] Appl. No.: 120,672

[22] Filed: Feb. 11, 1980

[51] Int. Cl.³ ............................................. F16M 13/00
[52] U.S. Cl. ....................................... 248/553; 70/63; 224/42.4
[58] Field of Search ............ 248/551, 552, 553, 223.1; 70/58, 63, DIG. 7; 109/52; 224/42.4, 319, 273

[56] References Cited

U.S. PATENT DOCUMENTS

| | | | |
|---|---|---|---|
| 1,203,282 | 10/1916 | Uth | 109/52 |
| 1,370,218 | 3/1921 | Malm et al. | 224/42.4 |
| 1,796,502 | 3/1931 | Boucher | 109/52 |
| 4,132,426 | 1/1979 | Svoboda | 248/223.1 X |

FOREIGN PATENT DOCUMENTS

| | | | |
|---|---|---|---|
| 346350 | 5/1919 | Fed. Rep. of Germany | 70/14 |
| 1154671 | 6/1969 | United Kingdom | 70/63 |

*Primary Examiner*—J. Franklin Foss
*Attorney, Agent, or Firm*—Emrich, Lee, Brown & Hill

[57] ABSTRACT

The apparatus includes a plate which is secured to the bottom of the container and includes depending feet which are received into keyhole slots on front and rear mounting brackets separately secured to the carrier rack. When the container is lowered onto the mounting brackets and slid rearwardly, reduced neck portions on the feet of the bottom plate are received in narrowed portions of the keyhole slots; and a latch engages a pin on the bottom plate so that the container cannot be removed until the latch is disengaged.

3 Claims, 5 Drawing Figures

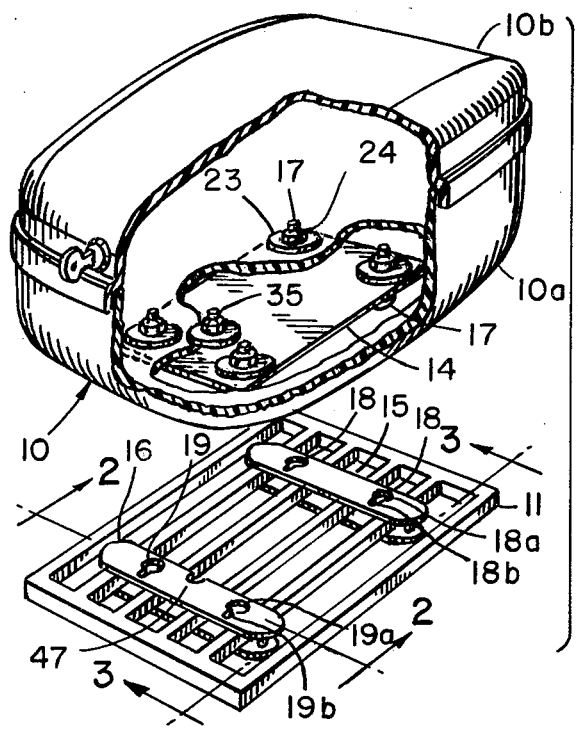
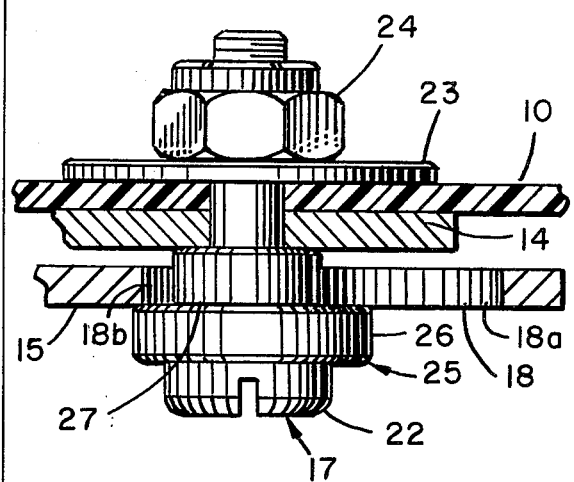
Fig. 1
Fig. 5
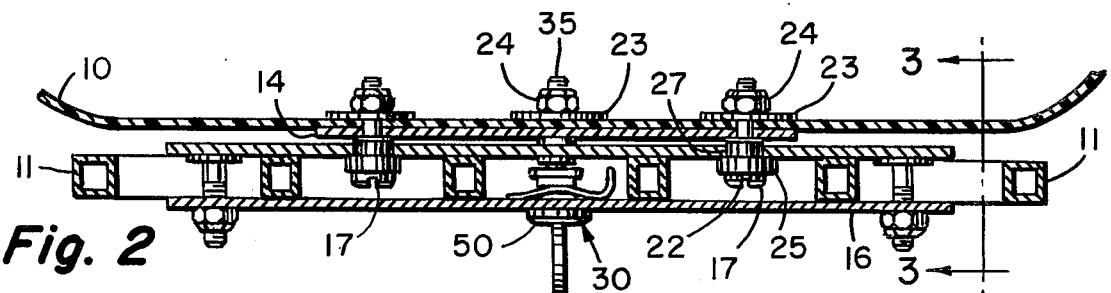
Fig. 2
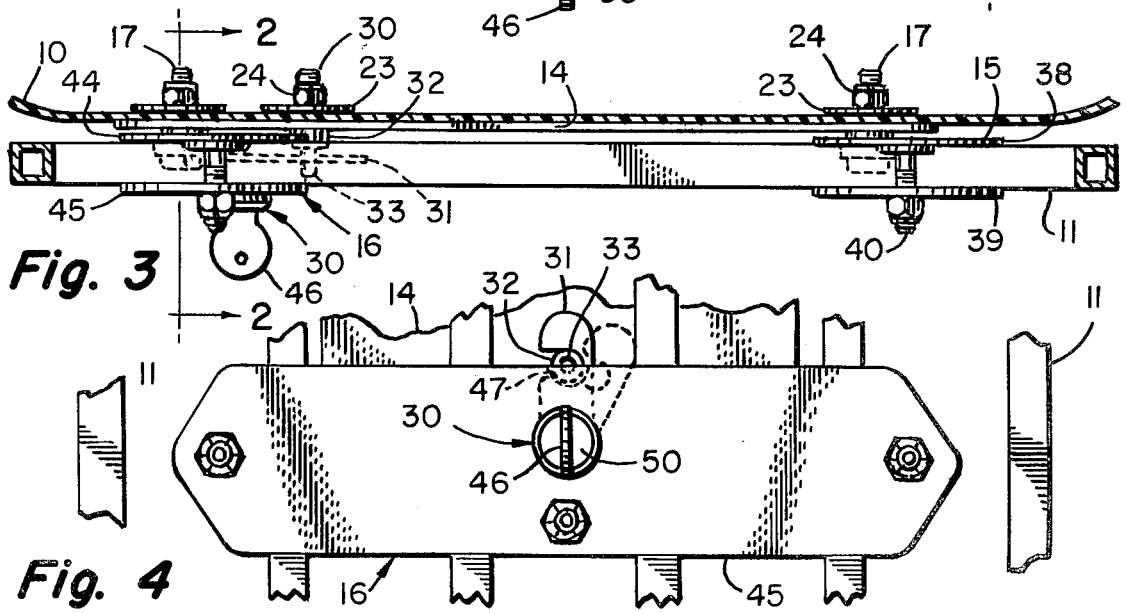
Fig. 3
Fig. 4

APPARATUS FOR REMOVABLY SECURING A CONTAINER TO A CARRIER RACK

BACKGROUND AND SUMMARY

The present invention relates to apparatus for removably securing a container to a rack, such as a carrier rack for a vehicle. Although the invention has broader application, it is particularly useful in connection with motorcycles where storage space is normally limited to a container having dimensions that will permit it to be mounted behind the seat of the vehicle. Typically, a carrier rack may be purchased and mounted to the vehicle for supporting the container.

It is desirable that the container be removable from the carrier rack because sometimes it may contain items valuable enough that it would be undesirable to leave them unattended. At the same time, it is desirable to provide a latch for the carrier so that it is not stolen easily if the vehicle is left unattended and the container is either empty or contains items which are not valuable enough to warrant carrying the container around.

The present invention, then, includes apparatus for removably securing a container to a vehicle rack, and for locking the container to the rack. Of particular importance is the fact that the apparatus of the present invention is provided in kit form, and that it is adaptable to a wide range of sizes and shapes for the container, as well as a wide range of sizes and designs for the carrier rack.

Briefly, the invention includes a mounting plate which is fastened to the bottom of the container by threaded fasteners. Each of the threaded fasteners includes a foot with an enlarged head and a reduced neck portion. The bottom plate also includes a locater or latch pin depending from it.

A front mounting assembly including a top plate is secured to the forward end of the carrier rack, and it includes a pair of keyhole slots having their reduced portions extending rearwardly. A rear mounting/latching assembly is similarly secured to the rear of the rack, and it also includes a top plate having keyhole slots. The keyhole slots are in register with the feet of the bottom plate on the container, so that when the container is lowered, the enlarged portions of the feet fit through the enlarged portions of the associated keyhole slots. The container is then moved rearwardly so that the reduced neck portions of the feet are received in the corresponding reduced portions of the keyhole slots. Thus, the enlarged heads of the feet members engage the reduced slot portions and prevent the container from being lifted upwardly.

A key-actuated lock including a latch member is provided on the rear mounting/latch assembly; and when the key is turned, a latch member is rotated into engagement with the locater pin on the bottom of the mounting plate to prevent the container from being shifted forwardly and therefore dislodged.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is an upper perspective view taken from the right and rear of apparatus constructed according to the present invention, with portions of the container cut away for clarity;

FIG. 2 is a transverse vertical cross sectional view of the rear mounting assembly taken through the sight line 2—2 of FIG. 1;

FIG. 3 is a right side view of the apparatus with the container in fragmentary form;

FIG. 4 is a bottom view of the rear mounting assembly showing the operation of the latch; and FIG. 5 is a close-up fragmentary elevational view of a shoulder bolt assembly.

DETAILED DESCRIPTION

Referring first to FIG. 1, reference numeral 10 generally designates a container. The container 10 forms no important part of the present invention, and it may be any one of a number of any types of cargo or document containers, such as an attache case, tote box, or specially designed container. In the illustrated embodiment, the container has a bottom 10A and a locking lid 10B. An important object of the present invention, however, is to provide a self-contained kit for securing the container 10 to a rack or carrier, generally designated 11, which, in turn, is mounted to the frame of a vehicle or other rigid structure.

Briefly, before discussing the details of the invention, the kit includes the following principal elements and their functions: a mounting plate generally designated 14 which is secured to the bottom of the container 10; a front mounting assembly 15 which is secured to the forward end of the rack 11; and a rear mounting/latching assembly generally designated 16 which is secured to the rear of the rack 11.

Briefly, when it is desired to secure the container 10 to the rack 11, the container is lowered onto the front mounting bracket assembly 15 and rear mounting-/latching assembly 16 such that four shoulder bolts, generally designated 17 are received in enlarged portions 18a of keyhole slots which are designated 18 for the front mounting assembly 15, and designated 19 for the rear mounting/latching assembly 16. The container 10 is then moved rearwardly so that the necks of the bolts 17 are received in the narrow portions 18b, 19b of the associated keyhole slots for attaching the container to the mounting assemblies. Finally, a latch generally designated 30 and secured to the rear mounting/latching assembly 16 is actuated from beneath such that a latching member 31 is rotated to engage a pin 33 which is integrally provided with an upper plate of the rear mounting/latching assembly.

Referring to FIGS. 1 and 5, the mounting plate assembly 14 is secured to the bottom of the container 10 by means of four threaded fasteners 17, each of which includes a threaded panhead bolt 22 which extends upward through the bottom of the container 10 and is secured by means of a washer 23 and locking nut 24. The bolt 22 also secures a foot generally designated 25 to the bottom of the mounting plate 14. The foot 25 includes an enlarged head portion 26 and a reduced neck portion 27. It is the reduced neck portion 27 which is received in the corresponding reduced portions 18b and 19b of the keyhole slots 18 and 19, described above.

A fifth fastener generally designated 35 in FIG. 1 is similarly secured to the bottom of the container 10, and it includes a locating shoulder 32 (FIG. 3) which aligns with the upper plate of the rear mounting bracket assembly 16, as will be described, and a latch pin 33 which extends below that plate.

Turning now to FIG. 3, the forward mounting bracket assembly 15 includes an upper plate 38 and a lower plate 39 mounted respectively above and below the carrying bracket 11. The plates 38, 39 are secured to the bracket 11 by means of conventional fasteners such as the one shown at 40 in FIG. 3. The upper plate 38 includes first and second keyhole slots, one of which is designated 18 and referred to above, for receiving the foot members of the forwardly located fasteners 17.

Similarly, the rear mounting/latching assembly 16 includes an upper plate 44 and a lower plate 45 which are secured to the carrying bracket 11 by threaded fasteners. The upper plate 44 provides the keyhole slots 19 mentioned in connection with FIG. 1, and it also includes a semi-circular locating slot 47 which is adapted to engage the locating portion 32 of the fifth fastener 35 on the container mounting plate 14. As mentioned above, the pin 33 extends beneath the plate 44.

A key actuated lock generally designated 50 is conventionally mounted to the bottom plate 45 of the rear mounting/latching assembly 16; and it includes the previously mentioned latch member 31 which is selectively movable by actuating a key 46 between an unlocking position (in which the member 31 disengages the pin 33), and a latching position (in which the slot of the member 31 engages the pin 33 and prevents the forward movement of the container 10). These positions are shown respectively in dashed and solid line in FIG. 4.

The operation of the apparatus will be apparent from the above description of the parts; however, briefly, the front mounting assembly 15 and rear mounting/latching assembly 16 are secured to the rack 11 as described above, using the plate 14 as a template to locate the keyhole slots. Next, the bottom plate 14 is secured to the bottom of the container. The container is lowered so that the feet 25 of the fasteners 17 secured to the bottom of the container are received in the enlarged portions of the keyhole slots 18, 19. The container is then slid rearwardly so that the reduced neck portions 27 of the feet 25 are received in the narrowed portions of their associated keyhole slots such that the shoulders 26 extend beyond the sides of those reduced portions of the associated keyhole slots. Finally, the lock 50 is actuated to the locking position so that the latch member 31 engages the locating pin 33, which prevents dislocation of the feet 17 from the narrowed portions of their associated keyhole slots.

Having thus disclosed in detail a preferred embodiment of the invention, persons skilled in the art will be able to modify certain of the structure which has been illustrated and substitute equivalent components for those disclosed while continuing to practice the principle of the invention; and it is, therefore, intended that all such modifications and substitutions be covered as they are embraced within the spirit and scope of the appended claims.

I claim:

1. Apparatus for removably securing a container having a bottom to a vehicle rack comprising: a plate; plate mounting means for securing said plate to the bottom of said container; a locator pin secured to said plate; feet means on said plate having an enlarged distal portion and a reduced proximal portion; front mounting assembly means including means adapted to be secured to the forward portion of said rack; rear mounting assembly means including a top plate and a bottom plate adapted to be located respectively above and beneath said rack, and threaded fastener means for securing said top and bottom plates together and to the rear portion of said rack; at least one of said mounting assembly means defining slot means in register with and adapted to receive associated feet means on said plate; said top plate including a locator slot adapted to receive the locator pin on said plate when said container is moved rearwardly such that said feet means are in securing relation with associated slot means; and latch means for latching said plate to one of said mounting assembly means when said reduced portions of said feet means are received in associated reduced portions of said slot means, said enlarged portions of said feet means preventing said plate from being removed vertically, and said latch means including a latch member having a latch portion engaging said locator pin when the same is received in the locator slot of said top plate of said rear mounting assembly means, for maintaining said locator pin in said locator slot to prevent lateral motion of said container relative to said rack and preventing said feet means for being dislodged from said slot means.

2. The apparatus of claim 1 wherein said plate mounting means includes a plurality of threaded fasteners, and wherein said feet means comprises at least one foot member having an enlarged head portion with an outside dimension greater than the interior dimension of the reduced portion of said slot means, and a reduced neck portion permitting it to be received in the reduced portion of said slot means.

3. The apparatus of claim 2 wherein said plate mounting means includes four fasteners for securing said plate to the bottom of said container, and said feet means comprise four foot members, each secured to said plate by a different one of said fasteners; and wherein each of said front and rear mounting assembly means includes a pair of keyhole slots in register with associated ones of said foot members.

* * * * *